Jan. 21, 1930.                L. L. BOUCHARD                1,744,100
ELECTRIC HEATING DEVICE FOR WINDSHIELDS AND OTHER WINDOWS
Filed April 28, 1928
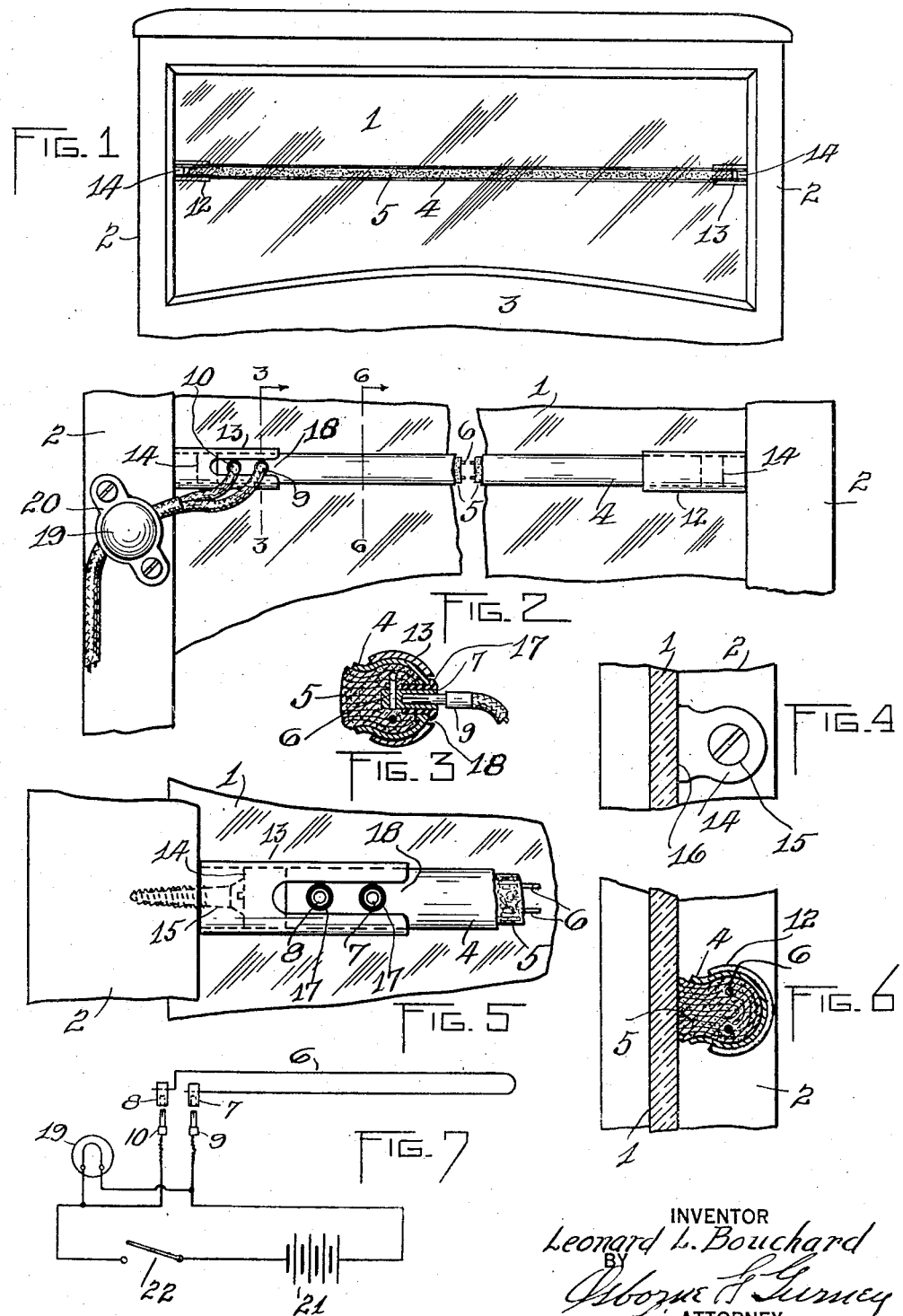
INVENTOR
Leonard L. Bouchard
BY
his ATTORNEY Patented Jan. 21, 1930

1,744,100

UNITED STATES PATENT OFFICE

LEONARD L. BOUCHARD, OF ROCHESTER, NEW YORK

ELECTRIC HEATING DEVICE FOR WINDSHIELDS AND OTHER WINDOWS

Application filed April 28, 1928. Serial No. 273,495.

The present invention relates to apparatus employed for keeping windows free from snow, sleet and ice, and has more especial reference to a device adapted for use on the windshields of road vehicles, airplane windows and the windows of locomotive cabs and pilot houses of steamships, the device functioning as a warmer to sufficiently heat the glass as to prevent the accumulation of snow and ice thereon so that vision through the window will not be obscured.

The ordinary windshield wiper, as is well known, does not function properly in all weather conditions in that it fails to prevent mist and sleet from freezing over the window area which it covers, and to overcome this objectionable feature is the main object of my invention. To this end I provide a simple and effective means for warming the glass or other transparent material of the window and so arranged as not to interfere with the windshield wiper, the latter in most States being required by law as a part of every automobile equipment.

Another object of the invention is the provision of a device of the character and for the purpose described which extends across the inside of a window in a fixed position and is, preferably, both adjustable and removably mounted.

A further object of the invention is the provision of an electrically heated window warmer of simple and inexpensive construction, readily mounted for use and quickly removable when not required, of few parts and not liable to derangement.

And, a still further object of the invention is to provide an adjustable mounting whereby the device may be used on windows of different sizes.

To these and other ends the invention consists of a device embodying certain parts and combinations of parts as will be fully set forth in the following description and particularly defined in the appended claims.

The accompanying drawings illustrating the invention are as follows;

Figure 1 is an exterior view of a windshield showing the invention mounted thereon.

Fig. 2 shows from the interior a fragmentary view of a windshield provided with the invention.

Fig. 3 is a sectional detail on the line 3—3, Fig. 2.

Fig. 4 is a vertical section through the windshield showing in face view one of the end blocks on which the device is mounted.

Fig. 5 is a view similar to Fig. 2 of one end of the device.

Fig. 6 is a sectional view on the line 6—6, Fig. 2.

And, Fig. 7 is a diagrammatic view of the circuit connections.

In the drawings similar reference numerals refer to similar parts throughout the several views.

At 1 there is shown a window which, in this instance, is represented as an automobile windshield mounted in a frame including the corner posts 2 of the body 3.

Extending longitudinally of the windshield is a warmer embodying the invention and comprising a strip of sheet material bent U-shape in cross section to form a channel member or casing 4 which is filled with a packing 5 of non-combustible and electrical insulating material, as sheet asbestos, and in which is embedded a heating element in the form of a resistance wire 6 having a return bend so that both terminals of the wire are adjacent one end of the device. The packing medium 5 forms a heating pad and projects slightly beyond the edges of the channel member, the walls of the latter adjacent their edges being pressed inwardly as shown to bind the pad and hold it compact and against displacement.

The ends of the wire 6 are secured to laterally extending terminals comprising rods 7 and 8 which extend through insulating bushings 17 carried by the channel member 4.

On the terminal end of the casing or channel member 4 is an axially adjustable sleeve 13 slotted at 18 to receive the bushings 17 and on the other end of the casing is a similar sleeve 12 not slotted.

Any suitable means may be provided for supporting the casing or holder 4. In this instance, such supporting means comprises a block 14 secured to the inner side face of each post 2 by means of a screw 15, such blocks having squared faces 16 which abut the inside of the glass 1 and thus form means for properly positioning the warmer with respect to the glass. That is, the outer ends of the sleeves 12 and 13 slidably engage over their respective blocks 14 and the relative arrangement of the casing 4, pad 5, sleeves 12 and 13 and blocks 14 is such that with the squared faces of the blocks positioned as stated the projecting or exposed face of the pad 5 will be held with pressure against the glass. The length of the casing 4 is such that by adjusting the sliding sleeves 12 and 13 the device may readily be fitted to windows of different sizes.

To the end of heating the packing member or pad 5 through the resistance wire 6 embedded therein, current is furnished to such wire from a source of electrical supply such as the battery 21 from which wires lead to split plugs 9 and 10 insertable in the terminals 7 and 8, respectively, the circuit being controlled by a switch 22 located at any convenient place as on the dash or one of the posts 2, and, preferably, a lamp 19 is provided in the circuit for giving visual indication when the current is on, such lamp being shown in a socket 20 mounted on a post 2.

From the foregoing it will be observed that I have provided a simple and effective electrically heated device that will warm a windshield or other window sufficiently to prevent it from freezing; that such device is adjustable to windows of different sizes; that it may readily be mounted and as easily detached should weather conditions not require its use; and that it occupies a fixed position and is so arranged as not to interfere with the operation of a windshield wiper. Although but one of the devices is shown and mounted longitudinally of the window, it will of course be understood that a plurality of the devices may be employed in some instances and that they may be arranged vertically or angularly with respect to the window.

What I claim is:

1. In a device of the character described, the combination with a window, of a casing having an opening, a packing within said casing and projecting through said opening, such packing comprising a heating member, means for imparting heat to the heating member, and means for removably supporting said casing in a fixed position with the projecting portion of said packing in contact with a surface of the window.

2. The combination with a window of a warming device therefor comprising a pad, a channel member as a holder for the pad, the pad forming a packing within the channel member and projecting through the opening thereof, an electrical heating element embedded in the pad, and means for supporting said channel member in a fixed position across the face of the window with said pad in contact with the window.

3. The combination with a window and a frame for the window, of a warming device comprising a holder U-shape in cross section, a packing within said holder, an electrical heating element embedded in said packing, a source of electrical supply for said element, and adjustable means on said holder for detachably mounting the holder in a fixed position across said window with the exposed face of the packing in contact with the window.

4. The combination with a window and a frame for the window, of a channel member with the opening thereof exposed to the window, a non-metal packing within the channel member and in contact with the window surface, an electrical heating element within said packing, a source of electrical supply for said element, sleeves adjustable on the ends of the channel member, and supporting blocks on said frame over which the free ends of said sleeves slidably engage.

5. The combination with a window and a window frame, of a device in accordance with claim 4 characterized by said supporting blocks having flattened surfaces for contact with the window, substantially as and for the purpose specified.

6. The combination with a window, as a windshield, and a frame therefor, of a window warmer comprising a non-metallic member in contact with the window surface, a holding for said member, means for supporting the holder on said frame, an electrical heating element embedded within said non-metallic member, and circuit connections to said heating element including a switch and means for giving indication when the circuit through the heating element is closed.

7. A combination in accordance with claim 6 characterized by said holder being removably supported in a fixed position and terminals on said heating element separably connected in said circuit.

LEONARD L. BOUCHARD.